United States Patent [19]

Braukmann

[11] 4,175,696
[45] Nov. 27, 1979

[54] THERMOSTATIC VALVE
[75] Inventor: Bernhard W. Braukmann, Mosbach, Fed. Rep. of Germany
[73] Assignee: Braukmann Armaturen AG, Rothrist, Switzerland
[21] Appl. No.: 744,384
[22] Filed: Nov. 23, 1976
[30] Foreign Application Priority Data
Nov. 26, 1975 [DE] Fed. Rep. of Germany ... 7537523[U]
[51] Int. Cl.$^2$ .............................................. F01P 7/02
[52] U.S. Cl. .................................. 236/34.5; 251/367
[58] Field of Search .................. 236/34, 34.5; 251/367
[56] References Cited
U.S. PATENT DOCUMENTS

| 3,167,249 | 1/1965 | Moosmayer et al. ................... | 236/34 |
| 3,389,887 | 6/1968 | Antunez, Jr. .......................... | 251/367 |
| 3,817,450 | 6/1974 | Mischke ............................. | 236/34.5 |

FOREIGN PATENT DOCUMENTS 1918769 10/1969 Fed. Rep. of Germany ............. 236/34

Primary Examiner—William E. Wayner
Attorney, Agent, or Firm—William T. Howell

[57] ABSTRACT

A thermostatic valve has a working element, a valve seat and a guide member for the working element below the valve seat; the guide member is connected to the valve seat through a plurality of holding arms, each supported by a yoke arm connected above the valve seat. The guide member has a plurality of slots on its underside and each of the holding arms at its free end has an inwardly extending claw engageable with one of the slots to secure the guide member to the valve.

2 Claims, 6 Drawing Figures

THERMOSTATIC VALVE

FIELD OF THE INVENTION

The invention relates to a thermostatic valve, especially one for controlling the coolant in a combustion engine, the said valve having a valve-seat ring carrying a yoke arm and a lower guide member for the working element, the said guide member being connected to the said valve-seat ring by means of engageable retaining arms each having a claw fitted at the free end.

PRIOR ART

A thermostatic valve of this kind is aready known per se, but it has a cage-like housing and, because of the connecting elements used therein, its assembly requires a great deal of attention and time.

SUMMARY OF THE INVENTION

It is therefore the purpose of this present invention to provide a thermostatic valve of the type mentioned above and which can be assembled quickly, simply and economically. It must, of course, be made of a minimum of individual parts and be able reliably to withstand any loads arising.

Rapid assembly, without any problems, is achieved by the use of three bayonet fastenings for connecting the parts of the housing accommodating the working element. The loading spring, with the valve plate and the working element are inserted into a corresponding mounting in the guide member. Thereafter, the valve-seat ring provided with the yoke arms and retaining arms are folded over until the hook-like claws thereof pass through the expanded parts of the arcuate slots of the bayonet fasteners on the guide member. The two parts of the bayonet fastener are then rotated in relation to each other, and this concludes the assembly. The slots in the bayonet fastener are of such a size and shape that they clamp the holding arms in position in the final assembly position. The expanded end on the other side may be sized so that the claws on the free end of the retaining arm may easily be passed through. This eliminates the troublesome introduction, previously required, of the claws into their mountings or recesses, due to their accurate cross sectional fit. The use of three yoke and retaining arms produces a statically specific system. Since the holding arms constitute extensions of the yoke arms, this makes it possible to use a material of lower strength or individual parts of smaller sizes. In certain cases, however, it may be desirable to provide the holding and/or yoke arms with at least one reinforcing rib. This may be fitted in such a manner as to provide the most satisfactory moment of resistance.

According to another configuration of the invention, the working element also projects outwardly beyond the guide member even when the valve is closed, and carries at its free end a second plate for a so-called by-pass control. This second plate, according to a further development of the invention is held by a knurled extension of the lower end of the working element.

According to another characteristic of the invention, a return spring, in the form of a helical compression spring, has one end bearing against the second plate and the other end bearing against the underside of the guide member.

According to still another characteristic of the invention, the cage-like housing, with its holding and yoke arms, accommodating the working element and the closing spring, together with the guide member, may all be made of a synthetic material, while the valve seat may be made of a ring inserted, preferably snapped, into the housing, and the valve plate of corrosion-resistant sheet. The material of which the snap-ring is made is governed by the requirements in each case. It may, for instance, be made of a relatively soft material such as rubber, plastic, or the like. According to still another configuration of the invention, the assembly may be simplified by providing the valve seat with a cross-sectionally triangular outer collar forming an inlet slope, while the housing has a receiving groove shaped accordingly. In this connection, one of the parts must be sufficiently resilient to allow the valve seat to snap into the valve-seat ring.

Still another advantage of the invention is that the working element carries, in the vicinity of the passage for the working piston, a sealing ring, preferably an O-ring, the said sealing ring being preferable snapped into a groove in the cover of the working element. This ensures uniform lubrication of the working piston and prevents cooling water from entering into the interior of the said working element. This undoubtedly extends the life of this component.

DESCRIPTION OF THE DRAWINGS

Three examples of embodiment of the invention are shown in the drawing attached hereto, wherein:

FIG. 6 is a bottom view of the guide member of the valve.

DESCRIPTION OF A PREFERRED EMBODIMENT

Figure 1:
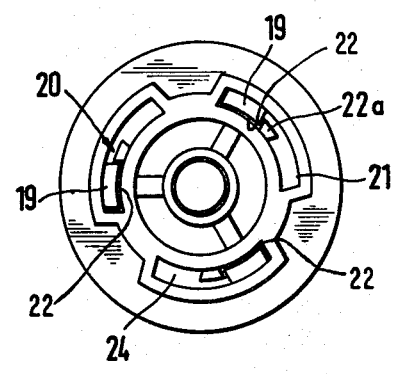
FIG. 1 is a view from below of the thermostatic valve according to the invention.

The thermostatic valve according to the invention is intended mainly for incorporation into the coolant system of an internal combustion engine, for example, a vehicle. Attachment of the valve into a conventionally expanded part of the coolant line is by means of a valve-seat ring, generally denoted by the numeral 1, the inner end of which forms a valve seat 2 and the outer end an attachment flange 3. A valve plate 4 is pressed upon the valve seat 2 by means of a closing spring 5, the upper end of the said closing spring engaging in a groove 6, whereas the lower end is guided in a recess 7 in a guide member 8 for a thermostatic working element 9. The latter consists of a cup-shaped lower part 10 with a cover 11. Clamped between these two parts is the outwardly projecting flange of a similarly cup-shaped nipple diaphragm 12. Located in the cavity between the said nipple diaphragm and lower part 10 is the expansion material 13. Working piston 14, which is pointed at its inner end, is inserted into the central cavity in the nipple diaphragm. Its projecting, free, rounded end engages in a corresponding recess in an adjusting screw 15. This screw may be screwed to a greater or lesser extent, as required, into the thread in a sleeve 16, the said sleeve being connected to the valve-seat ring 1 by means of three yoke arms 17, preferably distributed uniformly around the periphery and arranged upon an imaginary truncated cone, all preferably made out of one piece of synthetic material.

Holding arms 18 running parallel with each other may be fitted, or moulded, to valve-seat ring 1 in extension of yoke arms 17. The free ends of the said retaining arms carry inwardly projecting claws 19 each constituting one half of a bayonet fastener, the other half consisting of an arcuate slot 21, in guide member 8, associated with each claw. When the said bayonet fasteners are engaged, the spring 5 causes the claws 19 to bear from the bottom against retaining steps 22 to guide member 8. The steps 22 extend radially outwards and constrict slots 21 at these points to such an extent that parts of retaining arms 18, preferably reduced in cross section, can be moved thereinto. The amount of play should be such as to provide for a sliding fit of the retaining arms 18 in the restricted portions of the slots 21. Furthermore, in order to facilitate assembly, it is highly advantageous to widen the entrance 24 of the slot. Each retaining step 22 preferably has a stop 22a which prevents reverse rotation of the holding arms 18 after the claws 19 are in engagement with the respective retaining steps 22 and following rotation of the holding arms 18 to provide such engagement.

Guide member 8 has a central bore 25 into which the lower end of the thermostatic working element 9 may be pushed without any play.

As soon as the thermostatic working element is exposed to an increase in temperature, the expansion material expands which results in the extension of working piston 15. Since this piston is supported at the top, when the working element is heated, it must extend downwardly in relation to piston 14, in the direction of arrow 26. This movement takes place against the action of closing spring 5. Valve plate 4 is simultaneously lifted from valve seat 2, this allowing the medium cooling water for example, to flow through the thermostatic valve. As the temperature decreases, the foregoing procedure takes place in reverse, and closing spring 5 closes the valve again.

Figure 4:
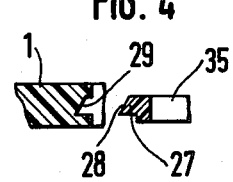
FIG. 4 is a detail, to an enlarged scale, of a second example of embodiment.
Figure 2:
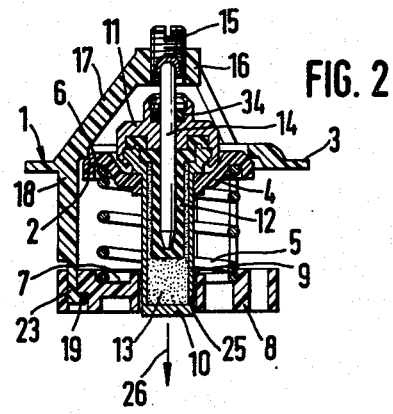
FIG. 2 is a section along the line II—II in FIG. 3.

The yoke and retaining arms may also have reinforcing ribs. Moreover, according to FIG. 4 and in contrast to FIG. 2, the annular valve seat may be made separately in the form of a ring 35 equipped with an outwardly projecting shoulder 27, the outside of which is conical for the purpose of forming an inlet slope. Shoulder 27 is snapped into a correspondingly shaped groove 29 in the interior of valve-seat ring 1. In this example of embodiment, it is proposed that valve plate 4 be made of corrosion-resistant material. Shoulder 27 could also be replaced by holding lugs distributed around the periphery.

Figure 5:
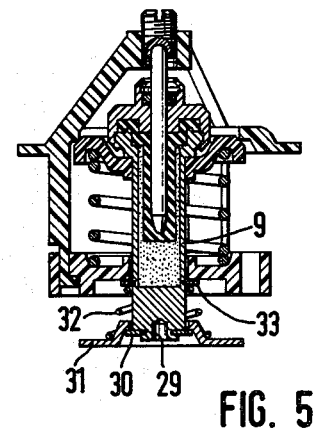
FIG. 5 is a longitudinal section though the centre of a third example of embodiment.
Figure 3:
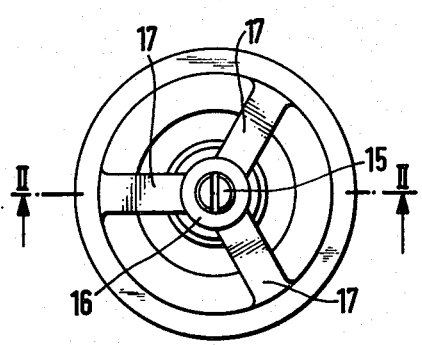
FIG. 3 is a plan view of the thermostatic valve according to the invention.

In the example of embodiment illustrated in FIG. 5, a hollow rivet 29 is fitted to the lower end of working element 9 for the purpose of attaching a holding disc 30 serving to support the inner end of a second valve plate 31. Bearing against the top of the latter is a restoring spring 32, the upper end of which bears against the underside of a second holding disc 33 which is placed against or snapped into a corresponding external groove in lower part 10 of thermostatic working element 9. The second holding disc bears in turn against the underside of valve-seat ring 1. The variant shown in FIG. 5 is designed for a controlled by-pass. Finally, it should be pointed out that a sealing ring, especially an O-ring 34, bearing against the working piston 14, is inserted into a groove in cover 11 of the thermostatic working element.

I claim:

1. A thermostatic valve having a working element, a housing enclosing said working element, said housing having a valve seat supported on one side by a yoke and connected on the other side to a plurality of spaced apart holding arms, a guide member for said working element below said valve seat, said plurality of spaced apart arms being attached to said guide member through a corresponding number of slots therein, each of said arms at its free end removed from said valve seat having a claw, each of said slots having a step therein providing a first opening large enough to permit normally disposed passage therethrough of an individual claw and a second opening, communicating with said first opening, to permit lateral passage of the arm supporting said claw on rotation of said arm, thereby resulting in said claw overlying the step in a respective slot, a valve plate above said guide member engageable with said valve seat, and a compression spring mounted on said guide member and bearing against said valve plate, said spring forcing said steps against an individual overlying claw after said arms have been rotated to enter the respective said second openings.

2. A thermostatic valve according to claim 1 wherein each said step has a stop adjacent said first opening to prevent counter rotation of said arms when each claw engages its respective step.

* * * * *